US007316614B2

(12) United States Patent
Dietz et al.

(10) Patent No.: US 7,316,614 B2
(45) Date of Patent: Jan. 8, 2008

(54) METHOD AND APPARATUS FOR CONDUCTING A SWEEPSTAKES

(76) Inventors: Michael J. Dietz, 7 Tildios, Peralta, NM (US) 87042; Earl D. Morris, 9505 Seabrook NE., Albuquerque, NM (US) 87111; Mark Olmstead, 3809 Montecito Rd., Denton, TX (US) 76205; Robert E. Houchin, 125 Reata Dr., Azle, TX (US) 76020; Johnney R. Weaver, 2117 Dicey Rd., Weatherford, TX (US) 76088

( * ) Notice: Subject to any disclaimer, the term of this patent is extended or adjusted under 35 U.S.C. 154(b) by 488 days.

(21) Appl. No.: 10/701,284

(22) Filed: Nov. 4, 2003

(65) Prior Publication Data

US 2005/0096135 A1 May 5, 2005

(51) Int. Cl.
*A63F 13/00* (2006.01)

(52) U.S. Cl. .................................................. 463/25

(58) Field of Classification Search ............ 463/16–20, 463/25, 29, 42; 705/14–18
See application file for complete search history.

(56) References Cited

U.S. PATENT DOCUMENTS

| | | | | |
|---|---|---|---|---|
| 4,815,741 A | | 3/1989 | Small | 273/138 |
| 5,348,299 A | | 9/1994 | Clapper, Jr. | 273/138 A |
| 5,377,975 A | | 1/1995 | Clapper, Jr. | 273/138 A |
| 5,487,544 A | | 1/1996 | Clapper, Jr. | 273/138 A |
| 5,536,008 A | | 7/1996 | Clapper, Jr. | 463/16 |
| 5,609,337 A | | 3/1997 | Clapper, Jr. | 273/138.2 |
| 5,645,485 A | | 7/1997 | Clapper, Jr. | 463/17 |
| 5,749,784 A | | 5/1998 | Clapper, Jr. | 463/17 |
| 5,810,664 A | | 9/1998 | Clapper, Jr. | 463/17 |
| 5,928,082 A | | 7/1999 | Clapper, Jr. | 463/16 |
| 5,941,771 A | | 8/1999 | Haste, III | 463/17 |
| 5,980,385 A | | 11/1999 | Clapper, Jr. | 463/17 |
| 6,028,920 A | | 2/2000 | Carson | 379/144 |
| 6,056,289 A | | 5/2000 | Clapper | 273/138.2 |
| 6,134,309 A | | 10/2000 | Carson | 379/144 |
| 6,183,362 B1 | * | 2/2001 | Boushy | 463/25 |
| 6,266,647 B1 | * | 7/2001 | Fernandez | 705/14 |
| 6,267,672 B1 | | 7/2001 | Vance | 463/29 |
| 6,527,175 B1 | | 3/2003 | Dietz et al. | 235/381 |
| 6,598,024 B1 | * | 7/2003 | Walker et al. | 705/16 |
| 6,656,050 B2 | * | 12/2003 | Busch et al. | 463/42 |
| 6,690,779 B2 | | 2/2004 | Walker et al. | 379/144.01 |
| 2001/0039511 A1 | * | 11/2001 | Duckworth et al. | 705/14 |
| 2002/0028708 A1 | * | 3/2002 | Busch et al. | 463/42 |
| 2003/0186739 A1 | * | 10/2003 | Paulsen et al. | 463/25 |

* cited by examiner

*Primary Examiner*—John M. Hotaling, II
(74) *Attorney, Agent, or Firm*—Guy V. Manning

(57) ABSTRACT

A method and apparatus for conducting a sweepstakes in which a consumer purchases a prepaid voucher for valuable goods and services unrelated to the sweepstakes, and in return, as a promotional bonus, is provided a corresponding number of optional entries into the sweepstakes is disclosed.

44 Claims, 4 Drawing Sheets

METHOD AND APPARATUS FOR CONDUCTING A SWEEPSTAKES

BACKGROUND

1. Field of the Invention

The present invention relates to methods and apparatuses for conducting sweepstakes. In particular, the present invention relates to a sweepstakes in which a consumer purchases a prepaid voucher for goods and services unrelated to the sweepstakes, and in return, as a promotional bonus, is provided a corresponding number of optional entries into the sweepstakes.

2. Description of Related Art

Sweepstakes, raffles, and lotteries have been around for centuries. People enjoy the experience of entering a sweepstakes and hoping to win the "grand" prize. In most sweepstakes, the participant purchases a ticket, or entry, for a nominal amount of money in exchange for a chance to win prizes that are valued significantly higher than the cost of the ticket. Most often, the odds against the participant of winning the best prizes are very high. However, in order to keep participants interested in the sweepstakes, or to entice the participants to play again, prizes having nominal values close to or below the cost of the entry are often awarded. As is well known, the participant's odds of winning these nominally valued prizes are typically close to 1:1.

Although the sweepstakes industry is heavy regulated, it remains very large and lucrative. Indeed, with the advent in recent years of prepaid vouchers, such as prepaid gasoline cards, prepaid credit cards, and prepaid phone cards ("PPC"), new games of chance and methods of conducting sweepstakes have been developed. For example, one of these new games of chance involves the purchase of a $1.00 "emergency" PPC that is only good for about one minute of telephone airtime. To play this type of game, a person goes up to a game terminal. Then, the person inserts currency into the terminal. In return, a corresponding number of $1.00 PPC's are dispensed into a tray.

The PPC's used in these games are typically multi-layered or folded pieces of paper or cardboard. The PPC's are preprinted and stored on a roll inside the game terminal. The PPC's used in these games are "read-only" devices that can be only be read by card readers in the game terminal. Once the these PPC's are printed, the data cannot be changed, and no more data can be added. Certain indicia is printed on each $1.00 PPC, including a personal identification number ("PIN") that is required to use the PPC from any telephone, bar codes and other graphical indicia that instruct the game terminal on what images to display, and an indication of what prize, if any, has been won. Thus, the "winning" and "losing" PPC's are predetermined.

One problem with these games is that each game terminal is a separate stand-alone machine. Because the PPC's are preprinted, there is no need or capability to interconnect or network the games machines together. This greatly reduces the number, type, and style of games that can be played. In other words, the participants cannot choose between different games, cannot compete against each other on different machines, and.

Another problem with these types of games of chance is that it is clear that most participants purchase the PPC for the sole purpose of entering the game of chance, not to use the PPC to buy telephone airtime. When the participant purchases the PPC, he participates in the game of chance, whether he wants to or not. Because people only purchase these "emergency" PPC's to participate in the game, the regulatory authorities in many jurisdictions have determined that these games are illegal lotteries. The reasoning is that, because the PPC has a nominal value, the participants are giving consideration merely to play a game of chance, not to buy and use the PPC to make telephone calls. This is evidenced by the fact that these $1.00 PPC's are often found unused in trash receptacles outside of establishments that sell such PPC's and offer such games of chance.

SUMMARY OF THE INVENTION

There is a need for a method and apparatus for conducting a sweepstakes in which a consumer purchases a prepaid voucher for valuable goods and services unrelated to the sweepstakes, and in return, as a promotional bonus, is provided a corresponding number of optional entries into the sweepstakes.

Therefore, it is an object of the present invention to provide a method and apparatus for conducting a sweepstakes in which a consumer purchases a prepaid voucher for valuable goods and services unrelated to the sweepstakes, and in return, as a promotional bonus, is provided a corresponding number of optional entries into the sweepstakes.

It is another object of the present invention to provide a method and apparatus for conducting a sweepstakes in which a consumer purchases a prepaid voucher for valuable goods and services unrelated to the sweepstakes, and in return, as a promotional bonus, is provided a corresponding number of optional entries into the sweepstakes, in which the same prepaid voucher can be reactivated at a later time so as to add valuable goods and services, such addition of goods and services resulting in an addition of a corresponding number of optional entries for the sweepstakes.

It is another object of the present invention to provide a method and apparatus for converting a conventional 8-liner machine into a sweepstakes terminal for conducting a sweepstakes in which a consumer purchases a prepaid voucher for goods and services unrelated to the sweepstakes, and in return, as a promotional bonus, is provided a corresponding number of optional entries into the sweepstakes.

These objects are achieved by providing a prepaid voucher for goods and services, such as a PPC, that can be purchased by a consumer, and a sweepstakes terminal with which the consumer may participate in the sweepstakes, if he so desires. When the PPC is purchased by the consumer, it is activated by an attendant to allow the consumer to make telephone calls from any telephone for a designated number of minutes of airtime. The PPC is also activated to provide a number of optional entries into the sweepstakes corresponding to the number of minutes of airtime purchased by the consumer. If the consumer chooses to participate in the sweepstakes, he proceeds to a sweepstakes terminal and inserts his PPC into a special card reader. Software loaded on either the validation terminal, a remote system manager computer, or remote centralized data center computers calculates and determines whether the participant's entry is a winner and the amount of the prize. The prizes are preferably cash or additional goods and services that can be transferred and downloaded onto the prepaid voucher. The amount of airtime available on the PPC, the number of optional entries available, the amount of accumulated prizes, and other messages are displayed on a display screen located on the sweepstakes terminal. The consumer must redeem his prizes by inserting the PPC into a special terminal operated by the attendant.

The present invention provides significant advantages, including: (1) the consumer can purchase a voucher for valuable goods and services, and receive, as a bonus, a corresponding number of optional entries into a sweepstakes; (2) the sweepstakes encourages more purchases of the vouchers for goods and services; (3) the consumer can purchase additional goods and services to be loaded onto the prepaid voucher, each such addition resulting in an additional corresponding number of optional entries into a sweepstakes; (4) the consumer may convert his winnings into additional telephone airtime, thereby generating a corresponding number of additional sweepstakes entries; (5) the results of the sweepstakes entries are not stored on the sweepstakes terminal, thereby reducing the risk of unauthorized tampering with the sweepstakes terminal; and (6) the method and apparatuses do not operate as an illegal lottery.

Additional objectives, features, and advantages will be apparent in the written description that follows.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

The present invention involves a method and apparatus for conducting a sweepstakes in which a consumer purchases a prepaid voucher for valuable goods and services unrelated to the sweepstakes, and in return, as a promotional bonus, is provided a corresponding number of optional entries into the sweepstakes. The prepaid voucher may be redeemable for a wide variety of goods and services, and can take on many different forms, including prepaid phone cards ("PPC"), gift certificates, prepaid gasoline cards, and prepaid credit cards. In the preferred embodiment of the present invention, the prepaid voucher is a PPC good for about twenty minutes of telephone airtime, sold for about $10.00 per PPC. Although the present invention will be described with reference to a PPC, it should be understood that the prepaid voucher may be any suitable voucher that may be redeemed for valuable goods and/or services. It is preferred that the prepaid voucher include no visual indicia or advertising, either textual or graphic, regarding the promotional sweepstakes.

One important feature of the present invention is that the prepaid voucher, i.e., the PPC, be for "valuable" goods and services. This is one feature that distinguishes the present invention from prior-art sweepstakes in which the voucher is for a nominal amount of goods or services, such as a $1.00 "emergency" PPC good for only one minute of telephone airtime. In those sweepstakes, it is clear that most participants purchase the prepaid voucher for the sole purpose of entering the sweepstakes, not to use the PPC to buy airtime. This is evidenced by the fact that most of these $1.00 PPC's are found unused in trash receptacles outside of establishments that sell such PPC's and offer such sweepstakes. Because the PPC's used in the present invention preferably cost about $10.00 or more, and are good for about twenty minutes of airtime, they are considered to be prepaid vouchers for "valuable" goods and services.

Figure 1:
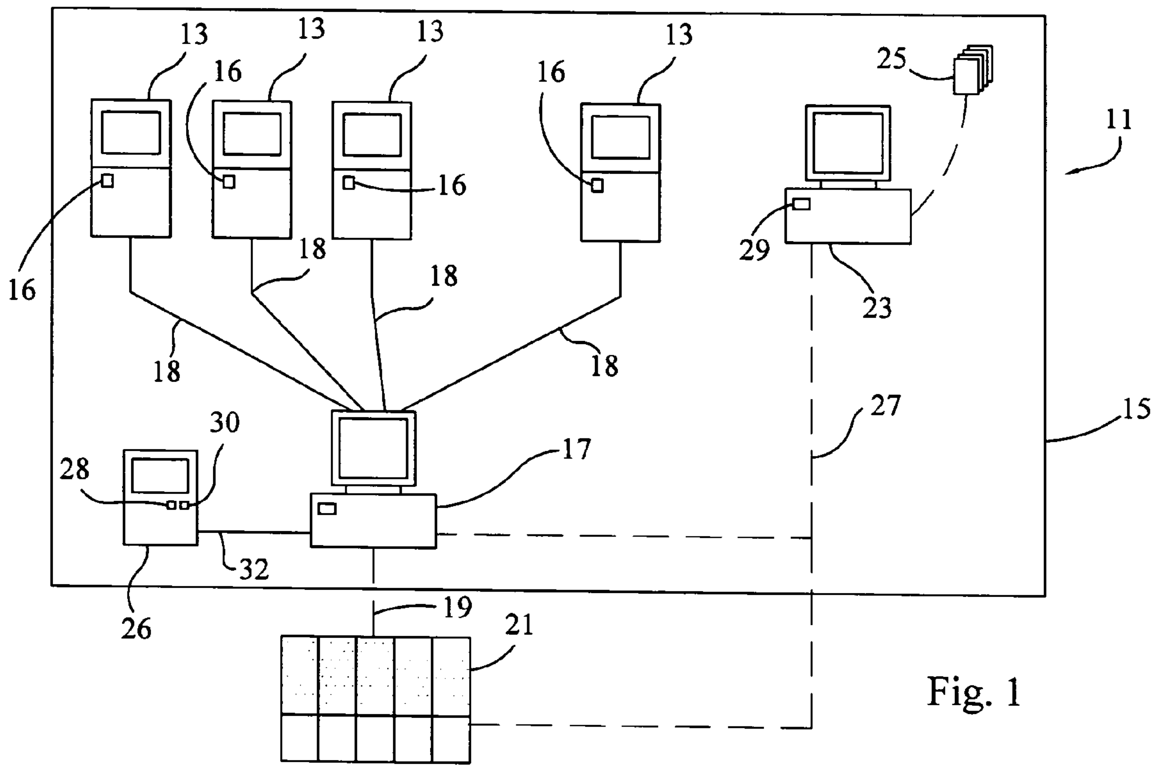
FIG. 1 is a high-level schematic illustrating the preferred embodiment of the method and apparatus of conducting a sweepstakes according to the present invention.

Referring to FIG. 1 in the drawings, a network 11 for conducting a sweepstakes according to the present invention is illustrated. Network 11 includes one or more game participation terminals, or sweepstakes terminals 13, networked together via a communication link 18 at a selected location, for example, a point-of-sale retail site indicated by box 15. In addition, each sweepstakes terminal 13 is networked via communication link 18 to at least one system manager computer 17. The system manager computers 17 are preferably located at retail site 15 and are networked via a communication link 19 to one or more remote data center computers 21.

Each sweepstakes terminal 13 includes a digital card reader 16 for reading and writing digital data to a digital storage means located on or within a PPC 25. PPC 25 is preferably similar to a credit card, with the digital storage means, such as a magnetic strip, located on the back of PPC 25. However, it should be understood that PPC 25 and digital storage means may be any of a wide variety of digital storage devices, including diskettes, memory cards, memory sticks, or any other suitable digital data storage and transfer devices.

Network 11 includes at least one activation station 23 located at each retail site 15 for activating prepaid vouchers for goods and services, i.e., PPC 25. For this purpose, a designated digital card reader 29 is operably associated with each activation station 23. Each PPC 25 includes a programmable means of storing digital data, such as a magnetic strip, for storing selected digital data in magnetic, electrical, optical, or any other suitable digital format. Before PPC 25 can be used to place telephone calls, PPC 25 must be activated. Activation of PPC 25 is performed by placing PPC 25 into card reader 29 and writing a personal identification number ("PIN") that to the magnetic strip.

It will be appreciated that it is not necessary that PPC 25 be used at the same retail site 15 at which PPC 25 was purchased. Should the consumer choose to participate in a sweepstakes, PPC 25 may be used at any time and at any retail site 15, provided PPC 25 has not expired (for instances in which PPC 25 includes an expiration date). It will be further appreciated that the data communication between PPC 25 and the other component of network 11 may be performed by means other than card readers. For example, PPC 25 or the other components of network 11 may be adapted to send and receive data via wireless transmissions, such as infrared connections or other suitable wireless connections.

In addition, network 11 may also include one or more recharge stations 26. Each recharge station 26 is networked via a communication link 32 to at least one system manager computer 17 located at retail site 15. Each recharge station 26 includes a card reader 28 and a currency reader 30. Recharge stations 26 allow the consumer to purchase additional telephone airtime for PPC 25 without having to go to an attendant. The consumer simply inserts PPC 25 into card reader 28, inserts currency, either paper or coin, into currency reader 30, and selects an amount of telephone airtime that he desires be added to PPC 25. It is not necessary that all of the airtime on PPC 25 be used up before more airtime is added. After the consumer inputs the amount of additional airtime desired, card reader 28 updates PPC 25 by digitally writing the necessary digital data to the digital storage means of PPC 25. With each recharge of additional airtime, PPC 25 is updated with a corresponding number of free entries into the optional promotional sweepstakes. Recharge stations 26 are the only machines in network 11 that include currency readers for accepting money. It is an important feature of the present invention that the consumer may not participate in the promotional sweepstakes from any recharge station 26.

Activation stations 23 may be networked together, and may be networked to system manager computers 17, data center computers 21, or both, by a communication link 27 similar to communication link 19. Communication links 18, 19, 27, and 32 may comprise modems, telephone lines, the Internet, satellites, wireless connections, or any combination thereof for sending and receiving digital data and signals. Communication links 18, 19, 27, and 32 provide a fast, efficient, reliable, and secure means for transferring digital data between activation terminals 23, PPC's 25, sweepstakes terminals 13, system manager computers 17, and data center computers 21.

System manager computers 17 provide a hub for sweepstakes terminals 13 and perform various other site-related functions. For example, system manager computers 17 manage the PIN's, manage the sweepstakes game entries, maintain and provide accounting information for site 15, contain the finite sweepstakes play information, and transmit the game entries to the sweepstakes terminals 13 for display to the consumer.

In the preferred embodiment, selected data is periodically transferred back and forth between system manager computers 17 and data center computers 21. For example, the number of PIN's available for activation and the number, type and amount of accumulated transactions may be reported by each system manager computer 17 to data center computers 21 on an hourly basis. If the number of available PIN's on any particular system manager computer 17 or activation station 23 reaches a predetermined number, then data center computers 21 transfer more PIN's to the appropriate system manager computer 17 or activation station 23. This periodic polling of network 11 ensures that data center computers 21 always have enough computing capacity to continuously conduct and control the games.

It will be appreciated that in alternate embodiments the functions and operations of system manager computers 17, data center computers 21, activation stations 23, and recharge stations 26 may be combined in different configurations into one or more computers or stations located either at retail site 15 or remote from retail site 15.

It is preferred that the programming for the sweepstakes game be performed entirely on data center computers 21. Data center computers 21 store, track, and maintain prize distribution tables for all sweepstakes games currently being played. Data center computers 21 are capable of storing about 40 million game plays. When all possible plays in a particular sweepstakes have been played, a new sweepstakes game is initiated. Thus, sweepstakes terminals 13 function primarily as a means of accepting the sweepstakes entries from PPC 25, displaying the results to the participant, and updating the digital data on PPC 25 upon completion of a gaming session. In other words, although the participant enters his game selections and plays the sweepstakes from sweepstakes terminal 13, the actual calculations and determinations of winning combinations are performed remotely by data center computers 21.

Figure 2:
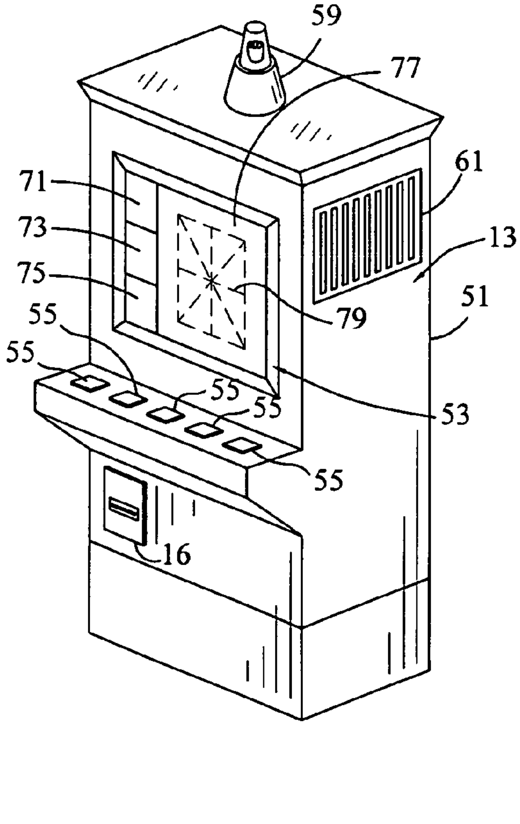
FIG. 2 is a perspective view of a sweepstakes terminal according to the present invention.

Referring now to FIG. 2 in the drawings, the preferred embodiment of sweepstakes terminal 13 according to the present invention is illustrated. Each sweepstakes terminal 13 includes a housing 51, a video display 53 carried by housing 51, a microprocessor, computer, and/or memory devices (not shown) for controlling sweepstakes terminal 13 carried within housing 51, one or more game buttons 55 carried by housing 51, digital card reader 16, and optional lights 59 and speakers 61 connected to housing 51 to enhance the experience of playing the sweepstakes. The microprocessor stores and executes certain terminal-related software for controlling video display 53, game buttons 55, card reader 57, lights 59, and speakers 61. It is important to note that in the preferred embodiment of the present invention, sweepstakes terminal 13 does not include any means of accepting currency.

The terminal-related software controls video display 53 and causes selected images to be displayed at selected portions of video display 53 at selected times. For example, one portion 71 of video display 53 may be used to display the number of minutes of airtime currently available on PPC 25; a second portion 73 of video display 53 may be used to display the number or amount of sweepstakes entries available on PPC 25; a third portion 75 of video display 53 may be used to display the number or amount of credits or "wins" currently available on PPC 25; and a fourth portion 77 of video display 53 may be used to display the status of the current sweepstakes game in progress. In the preferred embodiment, fourth portion 77 displays images of selected icons, both moving and stationary, so as to simulate the wheels of a slot machine. In particular, the images displayed in fourth portion 77 simulate an 8-liner gaming machine. Thus, fourth portion 77 may include a physical or digitally displayed pattern 79 indicating the eight different "pay" lines. As will be explained in more detail below, it is preferred that video display 53 include a touch-screen input feature by which the consumer may touch different portions of video display 53 to input certain selections.

Game buttons 55 may be programmed to initiate a wide variety of actions, for example: to select how many entry units to play; to play the maximum available number of entry units; to initiate the game; to convert winnings to additional telephone airtime minutes, thereby generating a corresponding number of additional optional entries into the sweepstakes; and/or to complete the game session. Game buttons 55 are preferably labeled with textual of graphical indicia to indicate the function of each button 55. It should be understood that the function of individual buttons 55 may vary depending upon the particular game type chosen by the consumer.

Card reader 16 allows the microprocessor to read the digital data from the storage means associated with PPC 25 and write digital data back to the digital storage means of PPC 25. Upon insertion of PPG 25, card reader 16 reads at least the following digital data from the magnetic strip: the number of minutes of airtime currently available on PPC 25; the number or amount of sweepstakes entry units available on PPC 25; the number or amount of credits or "wins" currently available on PPC 25; and the PIN, for validation purposes. When the participant chooses to end the gaming session, card reader 16 writes updated digital data back to the magnetic strip of PPC 25.

Figure 3:
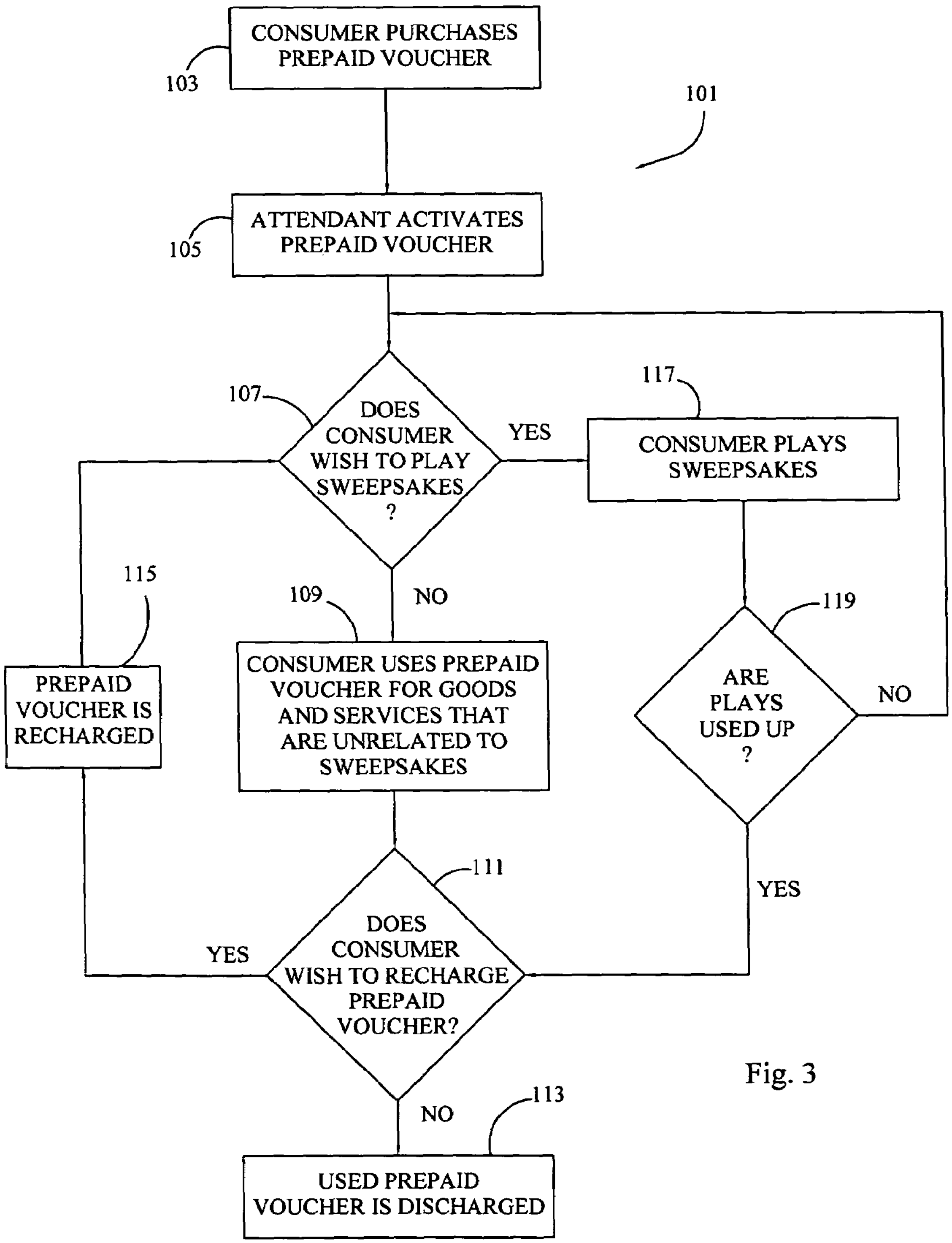
FIG. 3 is a high level flowchart illustrating the method and operation of the present invention.

Referring now to FIG. 3 in the drawings, a high level flowchart 101 depicting the method and operation of the present invention is illustrated. The present invention starts at step 103 with a consumer purchasing a prepaid voucher for valuable goods and services. As mentioned above, in the preferred embodiment, the prepaid voucher is PPC 25.

Next, in step 105, PPC 25 is activated by an attendant located at retail site 15. In activation step 105, the attendant inserts PPC 25 into designated digital card reader 29. Card reader 29 reads selected digital data from the digital storage means located on PPC 25, and then writes selected data back to the digital storage means. The data written to PPC 25 includes a PIN, and may include other digital data, such as the amount of telephone airtime available and the purchase price paid by the consumer for PPC 25. It will be appreciated that PPC 25 may be preprogrammed with the amount of telephone airtime available and a recommended purchase price. Once the attendant activates PPC 25 by writing the PIN to the digital storage means, the consumer is free to place telephone calls from any telephone until the telephone airtime is used up.

In accordance with the present invention, for each dollar amount of goods and services purchased by the consumer, a corresponding number of free entry units into the promotional sweepstakes is provided. This number of free entries may be written to PPC 25, or may be merely calculated by sweepstakes terminals 13, system manager computers 17, and/or data center computers 21 at the appropriate time. These free entries are updated and made available each time PPC 25 is "recharged" or "reloaded," as will be explained below. One feature of the present invention is that there is no charge for the entry units for the game. Thus, there is no charge to the consumer to participate in the game. Participation in the game is purely optional, and at no cost or loss to the consumer.

Then, in inquiry step 107, the consumer decides whether to participate in the optional sweepstakes. It is an important feature of the preferred embodiment of the present invention, that participation in the sweepstakes or game is optional. It is not necessary that the consumer participate in the sweepstakes, and the consumer does not participate in the sweepstakes merely by purchasing PPC 25. It is preferred that the optional sweepstakes be used as a promotional tool to promote sales of the prepaid vouchers. Thus, PPC 25 may be used to place telephone calls regardless of whether the consumer chooses to participate in the sweepstakes.

If the consumer decides not to participate in the optional sweepstakes, the procedure proceeds to step 109. In step 109, the consumer uses the activated prepaid voucher to purchase the goods and services for which the prepaid voucher was purchased. Thus, the consumer is free to use PPC 25 to place telephone calls from any telephone until the telephone airtime is used up. PPC 25 typically includes instructions for the consumer on how to use PPC 25 and how and when to enter the PIN. Once the consumer has expended all of the allotted airtime on PPC 25, the procedure continues with a second inquiry step 111, in which the consumer decides whether to recharge or reload PPC 25.

Inquiry step 111 is necessary, because in the preferred embodiment of the present invention, PPC 25 is adapted to be recharged or reloaded with additional airtime, if the consumer decides to purchase such additional airtime. If the consumer does not wish to purchase additional airtime, then the procedure concludes at step 113, in which the consumer may discard used PPC 25. On the other hand, if the consumer decides to purchase additional airtime, the procedure passes from inquiry step 111 to a recharge step 115. There are several ways in which the consumer may recharge PPC 25 with additional telephone airtime. First, the consumer may present PPC 25 to the attendant, who then inserts PPC 25 into card reader 29 of activation 23 and reactivates PPC 25 with the amount of additional telephone airtime purchased. Second, the consumer may insert PPC 25 into any one of recharge stations 26 and reactivate PPC 25 by inserting an appropriate amount of currency into currency reader 30. Third, the consumer may convert his winnings into additional telephone airtime by depressing one of game buttons 55 at an appropriate time during a game session. Regardless of the recharge method chosen, once PPC 25 is updated and reactivated, the consumer may again use PPC 25 to place telephone calls. Reactivation step 115 may include writing a new PIN and an additional corresponding number of free entries to the digital storage means of PPC 25. As is shown, the procedure then passes back to inquiry step 107, in which the consumer again decides whether to participate in the promotional sweepstakes.

It is an important feature of the present invention that the consumer may only purchase telephone airtime. Game entries are only provided as a result of a purchase of telephone airtime. The consumer may not directly purchase game entry units. The consumer is not charged to participate in the game, nor is the consumer's valuable goods and services are diminished by participation in the game.

Returning to inquiry step 107, if the consumer decides to enter the optional sweepstakes, the procedure passes to a game participation step 117. Step 117 is explained in more detail below with respect to FIG. 4. After each play, the process continues with an inquiry step 119, in which a determination is made as to whether additional plays are available. If all of the free entry units have been played, then the process continues with inquiry step 111, in which the consumer decides whether to purchase additional telephone airtime and have PPC 25 reactivated with the additional airtime and the additional optional free entry units for the sweepstakes. On the other hand, if all of the free plays have not been played, the process continues with inquiry step 107, in which the consumer decides whether to continue to participate in the sweepstakes.

The process depicted by flowchart 101 may continue for as long as the consumer (1) maintains available airtime on PPC 25; (2) maintains available free entries into the sweepstakes on PPC 25; or (3) recharges PPC 25 as provided for by activation stations 23 or recharge stations 26.

Figure 4:
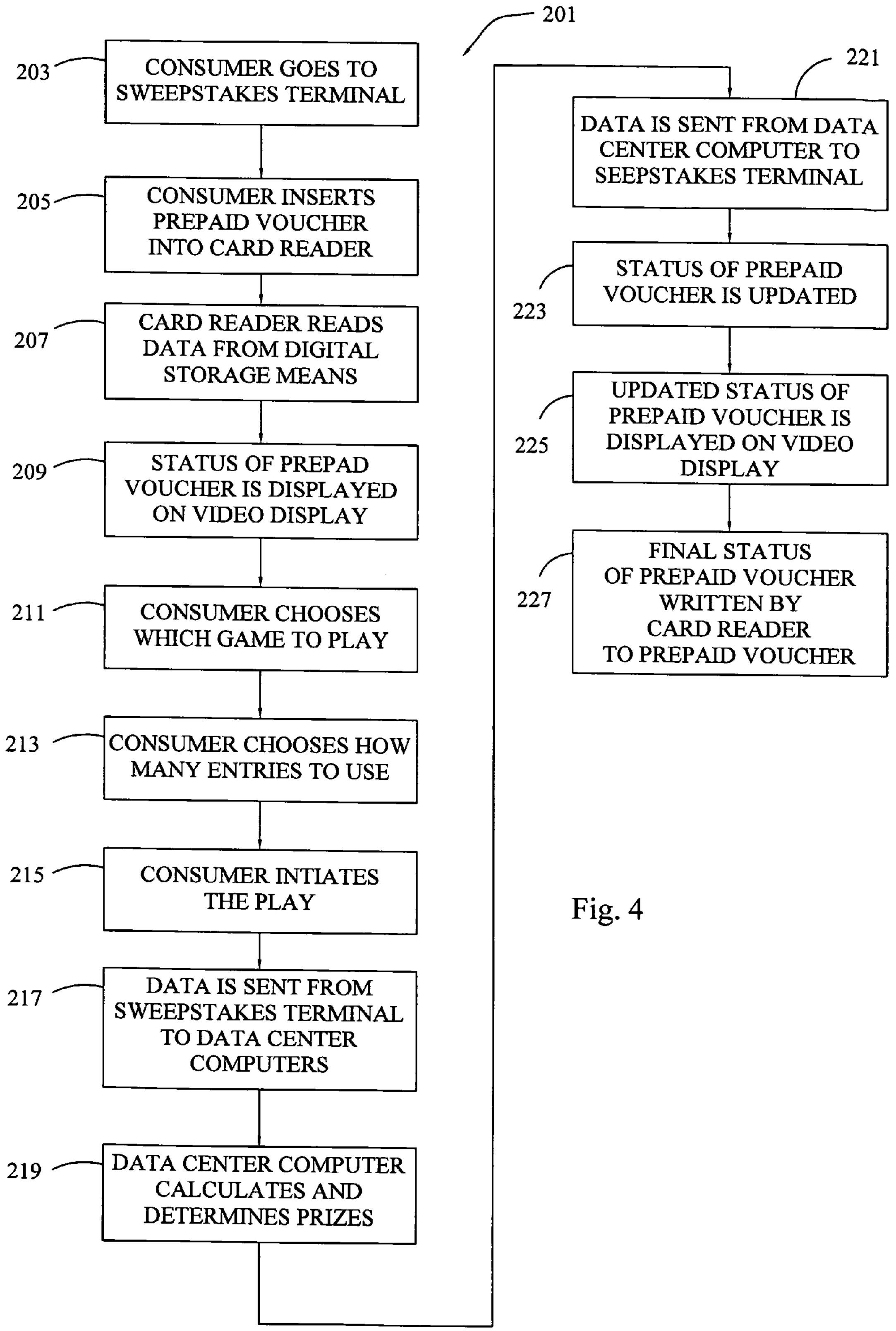
FIG. 4 is a detailed flowchart depicting a sweepstakes game session according to the present invention.

Referring now to FIG. 4 in the drawings, a flow chart 201 of the individual steps that comprise game participation step 117 is illustrated. Participation in the promotional sweepstakes begins with an initiation step 203 in which the consumer takes PPC 25 to a sweepstakes terminal 13. Then, at step 205, the consumer inserts PPC 25 into card reader 16 of sweepstakes terminal 13. Next, at step 207, card reader 16 reads selected data from the digital storage means located on PPC 25. For example, card reader 16 reads the amount of telephone airtime that was purchased, the purchase price of PPC 25, the PIN assigned to PPC 25 during the activation step, and the number of game entry units available for cases in which the number of game plays is not merely a calculated value corresponding to the amount of telephone airtime purchased.

Then, at step 209, the data read from PPC 25 is used by the microprocessor and the terminal-related software to control video display 53. During step 209, selected images are displayed at selected portions of video display 53 at selected times. As set forth above, the number of minutes of airtime currently available on PPC 25 may be displayed on first portion 71 of video display 53, the number or amount of sweepstakes entries available on PPC 25 may be displayed on second portion 73 of video display 53, the number or amount of credits or "wins" currently available on PPC 25 may be displayed on third portion 75 of video display 53, and the status of the current sweepstakes game in progress may be displayed on fourth portion 77 of video display 53. In the preferred embodiment, fourth portion 77 displays images of selected icons, both moving and stationary, so as to simulate the wheels of a slot machine. In particular, the images displayed in fourth portion 77 simulate an 8-liner gaming machine. Thus, fourth portion 77 may include physical or digitally displayed patterns 79 indicating the eight different "pay" lines of an 8-liner machine.

Next, as represented by step 211, the consumer chooses one of several possible games to play. This step is possible because in the preferred embodiment of the present invention, a plurality of promotional sweepstakes games may be conducted simultaneously by data center computers 21, with each game having a different style, genre, and/or graphical interface. For example, some consumers may prefer to play the sweepstakes using the 8-liner slot-machine type interface, while other consumers may prefer a draw poker interface. It will be appreciated that a wide variety of different games styles may be utilized, as such games are merely simulated by the game system software and displayed on video displays 53 of sweepstakes terminals 13. In the preferred embodiment, game selection step 211 is performed with the use of the touch-screen input feature of video display 53. In other words, when the consumer is ready to select a particular game type, the consumer merely depresses the portion video display 53 that is displaying a graphical image depicting that game type.

Once a game type has been chosen by the consumer, the process continues with step 213 in which the consumer chooses how many game entry units he would like to enter. The number of entry units may be expressed in numeric units, dollars and cents, or any other suitable units. In the preferred embodiment, the consumer's available entries are expressed in dollars and cents, with the minimum entry per play being $0.05, the maximum entry per play being $1.60, and with the entry being available in increments of $0.05. The consumer inputs the number of entry units to play by depressing one of buttons 55. One of buttons 55 may be programmed to automatically enter the maximum number of entry units for each game. As is common in such games, the higher the number of entries used, the higher the value of the prize, or the better the odds of winning particular prizes, if a prize is awarded.

The process continues with step 215, in which the consumer initiates the game. This is done by depressing one of the designated game buttons 55. Initiation of the game causes the microprocessor and terminal related software of sweepstakes terminal 13 to send signals and/or data over communication links 18, 19, and 27 to data center computers 21, as represented by data transmission step 217. Also, after initiating the game, either the microprocessor and terminal related software, or the data center computers 21, cause video display 53 to initiate a simulation of the game being played. For example, if an 8-liner game had been chosen, graphical images or movies would be displayed to depict the wheels of a slot machine turning and then stopping at preprogrammed intervals.

Then, in a calculation step 219, data center computers 21 calculate and determine how many, if any, prizes are to be awarded for that play. It is important to note that PPC 25 is not preprogrammed at the time of sale with any winning or losing combination of data. The consumer must choose to participate in the optional sweepstakes and submit an entry via a sweepstakes terminal 13 in order to play the sweepstakes and win any prizes. All calculations and determinations of prizes are conducted by data center computers 21 in response to entries made by consumers from sweepstakes terminals 13.

After data center computers 21 calculate and determine whether a prize has been won, then the process passes to a data transmission step 221, in which data center computers 21 transmit selected digital signals and data back to the appropriate sweepstakes terminal 13 via communication links 18, 19, and 27. Once the data has been received by sweepstakes terminal 13, the microprocessor and terminal related software of sweepstakes terminal 13, or data center computers 21, cause corresponding audio and video messages, such as "You're a Winner!" to be displayed on video display 53. In addition, the microprocessor and terminal related software and/or data center computers 21 activate lights 59 and speakers 61 to enhance the experience of playing the sweepstakes. Continuing with steps 223 and 225, after each game play, or selection made by the consumer, the status of PPC 25 is updated and displayed at the appropriate portion of video display 53.

Finally, as represented by step 227, when the consumer decides to end his game session, he depresses an appropriate button 55, thereby sending corresponding signals and data to sweepstakes terminal 13 and data center computers 21 that he no longer wishes to participate in the game. This causes card reader 16 to write the final status of PPC 25 to the digital storage means on PPC 25 and eject PPC 25 from card reader 16. PPC 25 may then be used to place telephone calls from any telephone.

Figure 5:
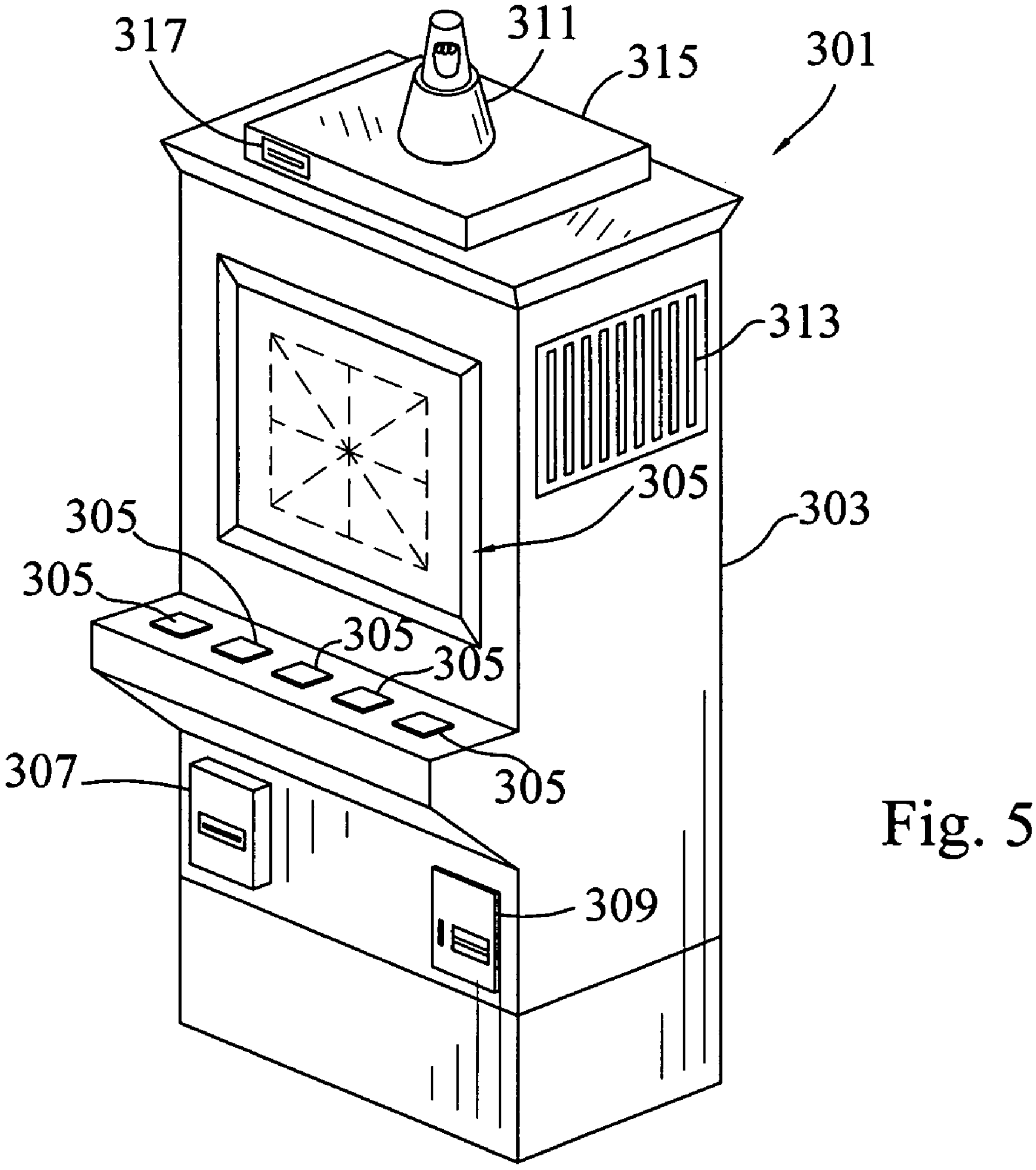
FIG. 5 is a perspective view of a sweepstakes terminal for use in an alternate embodiment of the present invention.

Referring now to FIG. 5 in the drawings, a sweepstakes terminal 301 for use with an alternate embodiment of the present invention is illustrated. This embodiment is a retrofit application in which sweepstakes terminal 301 is a modified 8-liner machine. The original 8-liner machine typically includes a housing 303, a video display 305 carried by housing 301, a microprocessor, computer, and/or memory devices (not shown) for controlling 8-liner machine carried within housing 303, one or more game buttons 305 carried by housing 303, a first digital card reader 307, a currency reader 309, lights 311, and speakers 313.

According to the present invention, the original 8-liner machine is converted into sweepstakes terminal 301 by the addition of a conversion kit 315 that includes the necessary microprocessor, computer, memory units, second card reader 317, communication links (not shown, but similar to communication links 18, 19, 27 and 32), and terminal-related software to allow the original 8-liner machine to function as a sweepstakes terminal according to the present invention. Second card reader 317 allows the microprocessor to read the digital data from the digital storage means associated with PPC 25 and write digital data back to the digital storage means of PPC 25. It should be understood that conversion kit 315 may be installed into the interior portion of housing 303, 50 that only second card reader 317 is visible and accessible from the exterior of sweepstakes terminal 301.

This retrofit embodiment of the present invention allows an owner or operator of network 11 to sell, lease, or rent conversion kits 317 to owners of conventional 8-liner machines. This is a particularly attractive option to owners of 8-liners machines who are unable to use their 8-liner machines due to certain regulatory restrictions in their jurisdictions. It will be appreciated that such sales, leases, and rentals may also be accompanied by opportunities to install, maintain, and service such converted sweepstakes terminals 301, and that the owner or operator of network 11 may also charge a fee to allow the newly converted 8-liner machines to operate in network 11. It will be appreciated that because the present invention involves a computer network, these fees and charges may be tracked, billed, maintained, accounted for, and otherwise processed automatically.

It will be appreciated by those skilled in the art that the present invention may be utilized with networked slot machines, arcade machines, or other gaming machines, including video games, handheld gaming devices, personal digital assistants, telephones, cell phones, computers, and a wide variety of other electronic data communication devices.

It is apparent that an invention with significant advantages has been described and illustrated. Although the present invention is shown in a limited number of forms, it is not limited to just these forms, but is amenable to various changes and modifications without departing from the spirit thereof.

We claim:

1. A network for conducting a game wherein a game player obtains game entry units upon purchasing valuable goods and services unrelated to the game, the network comprising:

a plurality of prepaid vouchers for goods and services unrelated to the game;

a means for activating the prepaid vouchers without requiring the game player to provide player identification information;

at least one game participation terminal located at a game site, each game participation terminal being adapted for data communication with the prepaid vouchers; and at least one system manager computer in data communication with the game participation terminals;

wherein upon activation of each of the prepaid vouchers, a corresponding number of entry units for participating in the game are provided to the game player for playing the game using the prepaid voucher.

2. The network according to claim 1, wherein the system manager computer is located at the game site.

3. The network according to claim 1, wherein the system manager computer is located remote from the game site.

4. The network according to claim 1, further comprising:

at least one data center computer in data communication with the system manager computer for controlling the game.

5. The network according to claim 4, wherein the data center computer is located at the game site.

6. The network according to claim 4, wherein the data center computer is located remote from the game site.

7. The network according to claim 4, wherein the data center computer is located at the game site and the system manager computer is located at the game site.

8. The network according to claim 4, wherein the data center computer is located remote from the game site and the system manager computer is located at the game site.

9. The network according to claim 4, wherein the game is a sweepstakes that is controlled by the data center computer.

10. The network according to claim 1, wherein the means for activating the prepaid voucher is a separate activation station in data communication with the system manager computer.

11. The network according to claim 1, further comprising:

at least one recharge station in data communication with the system manager computer for recharging the prepaid voucher with additional goods and services unrelated to the game.

12. The network according to claim 11, wherein the recharge station comprises:

a means for receiving currency; and a means for reactivating the prepaid voucher;

wherein upon reactivating of the prepaid voucher, a corresponding number of entry units for participating in the game are provided.

13. The network according to claim 1, wherein the prepaid voucher is a prepaid telephone card.

14. The network according to claim 1, wherein the prepaid voucher comprises:

a substrate; and a readable and writeable digital storage means carried by the substrate for storing digital data related to the game and the goods and services unrelated to the game.

15. The network according to claim 1, wherein the prepaid voucher is a prepaid credit card.

16. The network according to claim 1, wherein the game is a sweepstakes.

17. The network according to claim 1, wherein the game participating terminal comprises:

a housing;

a microprocessor disposed within the housing for controlling the game participation terminal;

a means for reading data from and writing data to the prepaid voucher;

a video display carried by the housing; and at least one button for inputting commands to the game participation terminal.

18. The network according to claim 17, wherein the game participation terminal includes no means for accepting currency.

19. The network according to claim 17, wherein the video display is a touch screen adapted for receiving and transmitting touch input commands to the game participating terminal.

20. The network according to claim 17, wherein the video display is parsed into a plurality of viewing portions for displaying the status of the game and the prepaid voucher.

21. The network according to claim 1, wherein the game is chosen from a plurality of different games.

22. The network according to claim 1, wherein the prepaid voucher is a debit card.

23. The network according to claim 1, wherein the prepaid voucher is an Internet access card.

24. The network according to claim 1, wherein the game participation terminal is a computer adapted for Internet communication.

25. The network according to claim 1, wherein the at least one game participation terminal is a computer adapted for Internet communication and the game site is an Internet cafe.

26. A method of conducting a sweepstakes wherein a game player obtains sweepstakes entries upon purchasing valuable goods and services unrelated to the sweepstakes, the method comprising the steps of:

providing prepaid vouchers for goods and services unrelated to the sweepstakes;

activating the prepaid vouchers with optional entries into the sweepstakes without requiring the game player to provide personal identifying information;

providing a plurality of sweepstakes terminals in data communication with each other; and permitting the game player to enter the sweepstakes with the optional entries.

27. The method according to 26, wherein the step of activating the prepaid vouchers with optional entries into the sweepstakes is achieved by issuing a personal identification number to the prepaid voucher for use with the goods and services unrelated to the sweepstakes.

28. The method according to claim 26, wherein the number of optional entries is directly proportional to the value of the prepaid voucher.

29. The method according to claim 26, wherein the prepaid voucher is a prepaid phone card; and the goods and services unrelated to the sweepstakes are telephone air time minutes.

30. The method according to claim 26, further comprising the steps of:

providing at least one system manager computer for controlling the sweepstakes terminals;

placing the system manager computer in data communication with the sweepstakes terminals; and controlling the sweepstakes terminals with the system manager computer.

31. The method according to claim 26, further comprising the steps of:

providing at least one data center computer at a location that is remote from the sweepstakes terminals;

placing the data center computer in data communication with the system manager computer; and conducting the sweepstakes with the data center computer and displaying the results of the sweepstakes on the sweepstakes terminals.

32. The method according to claim 26, further comprising the steps of:

providing at least one recharge station having a means for receiving currency; and a means for reactivating the prepaid voucher with additional goods and services unrelated to the game;

placing the recharge station in data communication with the system manager computer;

placing the prepaid voucher in data communication with the means for reactivating the prepaid voucher; and reactivating the prepaid voucher with additional goods and services unrelated to the game and a corresponding number of entry units for participating in the sweepstakes.

33. The method according to claim 26, wherein the prepaid vouchers are credit cards.

34. The method according to claim 26, wherein the prepaid vouchers are prepaid credit cards.

35. The method according to claim 26, wherein the prepaid vouchers are debit cards adapted for use at automatic teller machines.

36. The method according to claim 26, wherein the sweepstakes terminals are computers adapted for Internet communication.

37. The method according to claim 26, wherein the step of providing a plurality of sweepstakes terminals in data communication with each other is achieved by providing an Internet cafe; and at least one of the sweepstakes terminals is a computer located within the Internet cafe adapted for Internet communication.

38. A method of conducting a sweepstakes wherein a game player obtains sweepstakes entries upon purchasing valuable goods and services unrelated to the sweepstakes, the method comprising the steps of:

providing a plurality of prepaid vouchers for goods and services unrelated to the sweepstakes;

providing at least one activation terminal for activating the prepaid vouchers;

providing a plurality of interconnected sweepstakes terminals at a first location, each sweepstakes terminal having a video display, input buttons, and a means for receiving the prepaid vouchers;

providing at least one system manager computer at the first location;

providing a data center computer at a second location that is remote from the first location;

placing the sweepstakes terminals, the system manager computers, the activation terminals, the data center computers, and the means for reactivating the prepaid vouchers in data communication;

activating at least one of the plurality of prepaid vouchers with the activation terminal, so as to create a number of optional free entries into the sweepstakes corresponding to the value of the goods and services without requiring the game player to identify himself;

receiving the activated prepaid voucher in data communication with the means for receiving the prepaid voucher;

conducting the sweepstakes in response to game selections input at the sweepstakes terminal with the video display and the input buttons; and displaying the results of the sweepstakes play in the video display.

39. The method according to claim 38, further comprising the steps of:

providing a means for reactivating the prepaid vouchers with additional goods and services unrelated to the sweepstakes; and reactivating the prepaid voucher, so as to create an additional number of optional free entries into the sweepstakes corresponding to the value of the additional goods and services.

40. The method according to claim 39, wherein the means for reactivating the prepaid vouchers with additional goods and services unrelated to the sweepstakes is integral with the activation terminal.

41. The method according to claim 39, wherein the means for reactivating the prepaid vouchers with additional goods and services unrelated to the sweepstakes is a separate recharge station that is a data communication with the system manager computers.

42. The method according to claim 39, wherein the means for reactivating the prepaid vouchers with additional goods and services unrelated to the sweepstakes is a software routine for converting sweepstakes prizes into goods and services unrelated to the sweepstakes.

43. A network for conducting a game comprising:

a prepaid voucher for goods and services unrelated to the game;

a means for activating the prepaid voucher;

at least one game participation terminal located at a game site, each game participation terminal being adapted for data communication with the prepaid voucher; and at least one system manager computer in data communication with the game participation terminals;

wherein at least one of said game participation terminals is an 8-liner machine having a housing;

an 8-liner microprocessor disposed within the housing for controlling the 8-liner machine;

a video display carried by the housing;

at least one button for inputting commands to the 8-liner machine; and a conversion kit for converting the 8-liner machine to a game participating terminal, the kit having a conversion microprocessor in data communication with the 8-liner microprocessor and the system manager computer; and a means for reading data from and writing data to the prepaid voucher; and wherein upon activation of the prepaid voucher, a corresponding number of entry units for participating in the game are provided.

44. A network for conducting a game comprising:

a prepaid voucher for goods and services unrelated to the game;

a means for activating the prepaid voucher;

at least one system manager computer in data communication with the means for activating the prepaid vouchers; and at least one 8-liner machine located at a game site, each 8-liner machine adapted for data communication with the prepaid voucher, the 8-liner machine having an 8-liner microprocessor controlling the 8-liner machine;

at least one button for inputting commands to the 8-liner microprocessor;

a conversion microprocessor in data communication with the 8-liner microprocessor and the system manager computer; and a means for reading data from and writing data to the prepaid voucher, wherein upon activation of the prepaid voucher, a corresponding number of entry units for participating in the game are provided.

* * * * *

UNITED STATES PATENT AND TRADEMARK OFFICE

CERTIFICATE OF CORRECTION

PATENT NO. : 7,316,614 B2
APPLICATION NO. : 10/701284
DATED : January 8, 2008
INVENTOR(S) : Robert E. Houchin It is certified that error appears in the above-identified patent and that said Letters Patent is hereby corrected as shown below:

On the Title Page, Item No. (76) Inventors: should read as follows:

Robert E. Houchin, 125 Reata Dr., Azle, TX (US) 76020

Signed and Sealed this

Twenty-ninth Day of January, 2008

*Jon W. Dudas*

JON W. DUDAS
*Director of the United States Patent and Trademark Office*

US007316614C1

(12) EX PARTE REEXAMINATION CERTIFICATE (7014th)

United States Patent

Houchin

(10) Number: US 7,316,614 C1

(45) Certificate Issued: Aug. 18, 2009

(54) METHOD AND APPARATUS FOR CONDUCTING A SWEEPSTAKES

(76) Inventor: Robert E. Houchin, 125 Reata Dr., Azle, TX (US) 76020

Reexamination Request:
No. 90/009,070, May 2, 2008

Reexamination Certificate for:
Patent No.: 7,316,614
Issued: Jan. 8, 2008
Appl. No.: 10/701,284
Filed: Nov. 4, 2003

Certificate of Correction issued Jan. 29, 2008.

(51) Int. Cl.
*A63F 9/24* (2006.01)
*A63F 13/00* (2006.01)
*G06F 17/00* (2006.01)
*G06F 19/00* (2006.01)

(52) U.S. Cl. ........................................................ 463/25

(58) Field of Classification Search ........................ None
See application file for complete search history.

(56) References Cited

U.S. PATENT DOCUMENTS

| | | | |
|---|---|---|---|
| 5,324,035 | A | 6/1994 | Morris et al. |
| 5,577,109 | A | 11/1996 | Stimson et al. |
| 5,909,486 | A | 6/1999 | Walker et al. |
| 5,928,082 | A | 7/1999 | Clapper, Jr. |
| 5,951,397 | A | 9/1999 | Dickinson |
| 6,000,608 | A | 12/1999 | Dorf |
| 6,213,874 | B1 | 4/2001 | Heflin |
| 6,722,977 | B1 | 4/2004 | Heflin |
| 6,852,029 | B2 | 2/2005 | Baltz et al. |
| 6,969,319 | B2 | 11/2005 | Rowe et al. |
| 7,063,617 | B2 | 6/2006 | Brosnan et al. |
| 7,104,443 | B1 | 9/2006 | Paul et al. |
| 2003/0157979 | A1 | 8/2003 | Cannon et al. |

OTHER PUBLICATIONS

Harley Promotion: Usenet posting posted on Aug. 25, 1997, available at: http://groups.google.com/group/rec.motorcycles.harley/msg/ale723121ec29c53.

*Primary Examiner*—Beverly M. Flanagan

(57) ABSTRACT

A method and apparatus for conducting a sweepstakes in which a consumer purchases a prepaid voucher for valuable goods and services unrelated to the sweepstakes, and in return, as a promotional bonus, is provided a corresponding number of optional entries into the sweepstakes is disclosed.

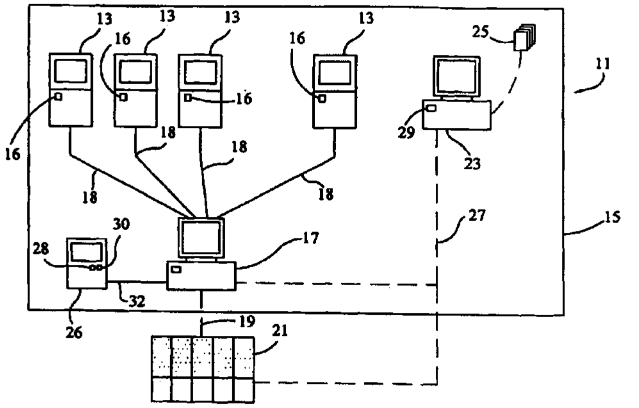

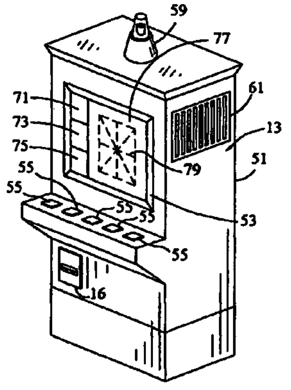

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 26–42 is confirmed.

Claims 1, 43 and 44 are determined to be patentable as amended.

Claims 2–25, dependent on an amended claim, are determined to be patentable.

1. A network for conducting a game wherein a game player obtains game entry units upon purchasing valuable goods and services unrelated to the game, the network comprising:

a plurality of prepaid vouchers for goods and services unrelated to the game;

a means for activating the prepaid vouchers without requiring the game player to provide player identification information;

at least one game participation terminal located at a game site, each game participation terminal being adapted for data communication with the prepaid vouchers; and at least one system manager computer in data communication with the game participation terminals;

wherein upon activation of each of the prepaid vouchers, a corresponding number of entry units for *optionally* participating in the game are provided to the game player for playing the game using the prepaid voucher.

43. A network for conducting a game comprising:

a prepaid voucher for goods and services unrelated to the game;

a means for activating the prepaid voucher;

at least one game participation terminal located at a game site, each game participation terminal being adapted for data communication with the prepaid voucher; and at least one system manager computer in data communication with the game participation terminals;

wherein at least one of said game participation terminals is an 8-liner machine having a housing;

an 8-liner microprocessor disposed within the housing for controlling the 8-liner machine;

a video display carried by the housing;

at least one button for inputting commands to the 8-liner machine; and a conversion kit for converting the 8-liner machine to a game participating terminal, the kit having a conversion microprocessor in data communication with the 8-liner microprocessor and the system manager computer; and a means for reading data from and writing data to the prepaid voucher; and wherein upon activation of the prepaid voucher, a corresponding number of entry units for *optionally* participating in the game are provided.

44. A network for conducting a game comprising:

a prepaid voucher for goods and services unrelated to the game;

a means for activating the prepaid voucher;

at least one system manager computer in data communication with the means for activating the prepaid vouchers; and at least one 8-liner machine located at a game site, each 8-liner machine adapted for data communication with the prepaid voucher, the 8-liner machine having an 8-liner microprocessor controlling the 8-liner machine;

at least one button for inputting commands to the 8-liner microprocessor;

a conversion microprocessor in data communication with the 8-liner microprocessor and the system manager computer; and a means for reading data from and writing data to the prepaid voucher, wherein upon activation of the prepaid voucher, a corresponding number of entry units for *optionally* participating in the game are provided.

* * * * *

US007316614C2

(12) EX PARTE REEXAMINATION CERTIFICATE (7921st)

United States Patent

Houchin

(10) Number: US 7,316,614 C2

(45) Certificate Issued: Dec. 7, 2010

(54) METHOD AND APPARATUS FOR CONDUCTING A SWEEPSTAKES

(76) Inventor: Robert E. Houchin, 125 Reata Dr., Azle, TX (US) 76020

Reexamination Request:
No. 90/009,585, Sep. 24, 2009

Reexamination Certificate for:

| | |
|---|---|
| Patent No.: | **7,316,614** |
| Issued: | **Jan. 8, 2008** |
| Appl. No.: | **10/701,284** |
| Filed: | **Nov. 4, 2003** |

Reexamination Certificate C1 7,316,614 issued Aug. 18, 2009

Certificate of Correction issued Jan. 29, 2008.

(51) Int. Cl.

| | |
|---|---|
| ***A63F 13/00*** | (2006.01) |
| ***A63F 9/24*** | (2006.01) |
| ***G06F 17/00*** | (2006.01) |
| ***G06F 19/00*** | (2006.01) |

(52) U.S. Cl. ........................................................ 463/25

(58) Field of Classification Search ........................ None
See application file for complete search history.

(56) References Cited

U.S. PATENT DOCUMENTS

| | | | |
|---|---|---|---|
| 5,324,035 | A | 6/1994 | Morris et al. |
| 5,577,109 | A | 11/1996 | Stimson et al. |
| 5,909,486 | A | 6/1999 | Walker et al. |
| 5,928,082 | A | 7/1999 | Clapper, Jr. |
| 5,951,397 | A | 9/1999 | Dickinson |
| 6,000,608 | A | 12/1999 | Dorf |
| 6,213,874 | B1 | 4/2001 | Heflin |
| 6,852,029 | B2 | 2/2005 | Baltz et al. |
| 6,969,319 | B2 | 11/2005 | Rowe et al. |
| 7,063,617 | B2 | 6/2006 | Brosnan et al. |
| 7,104,443 | B1 | 9/2006 | Paul et al. |
| 2003/0157979 | A1 | 8/2003 | Cannon et al. |

OTHER PUBLICATIONS

Harley Promotion; Usenet posting posted on Aug. 25, 1997, available at: http://groups.google.com/group/motorcycles.harley/msg/ale723121ec29c53, 2 pp.

*Primary Examiner*—Glenn K. Dawson

(57) ABSTRACT

A method and apparatus for conducting a sweepstakes in which a consumer purchases a prepaid voucher for valuable goods and services unrelated to the sweepstakes, and in return, as a promotional bonus, is provided a corresponding number of optional entries into the sweepstakes is disclosed.

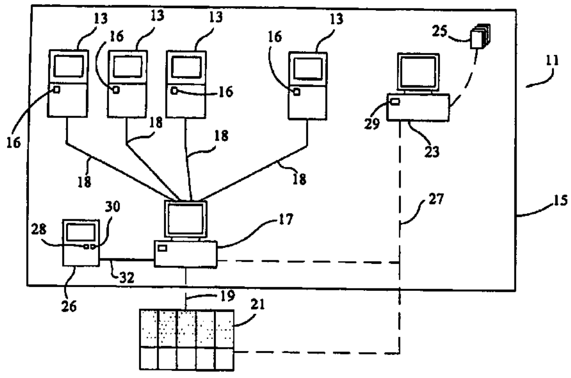

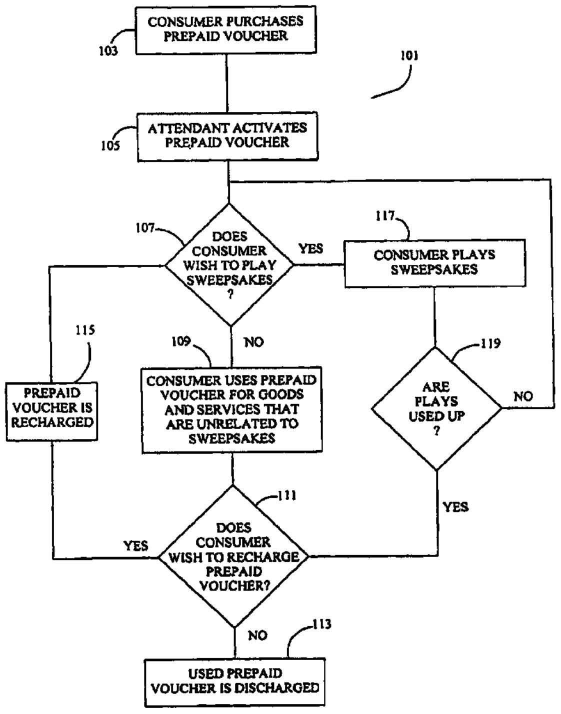

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 16 is cancelled.

Claims 1-9, 11, 12, 14, 17-21, 24-28, 32, 38, 39, 43 and 44 are determined to be patentable as amended.

Claims 10, 13, 15, 22, 23, 29-31, 33-37 and 40-42, dependent on an amended claim, are determined to be patentable.

1. A network for conducting a [game] *sweepstakes* wherein a game player obtains [game] *sweepstakes* entry units upon purchasing valuable goods and services unrelated to the [game] *sweepstakes*, the network comprising:

a plurality of prepaid vouchers for goods and services unrelated to the [game] *sweepstakes*;

a means for activating the prepaid vouchers without requiring the game player to provide player identification information;

at least one [game] *sweepstakes* participation terminal located at a [game] *sweepstakes* site, each [game] *sweepstakes* participation terminal being adapted for data comunication with the prepaid vouchers; and at least one system manager computer in data communication with the [game] *at least one sweepstakes* participation [terminals] *terminal*;

wherein upon activation of each of the prepaid vouchers, a corresponding number of *sweepstakes* entry units for optionally [participating] *entering* in the [game] *sweepstakes* are provided to the game player for [playing] *entering* the [game] *sweepstakes* using the prepaid voucher.

2. The network according to claim 1, wherein the system manager computer is located at the [game] *sweepstakes* site.

3. The network according to claim 1, wherein the system manger computer is located remote from the [game] *sweepstakes* site.

4. The network according to claim 1, further comprising: at least one data center computer in data communication with the system manager computer for controlling the [game] *sweepstakes*.

5. The network according to claim 4, wherein the data center computer is located at the [game] *sweepstakes* site.

6. The network according to claim 4, wherein the data center computer is located remote from the [game] *sweepstakes* site.

7. The network according to claim 4, wherein the data center computer is located at the [game] *sweepstakes* site and the system manager computer is located at the [game] *sweepstakes* site.

8. The network according to claim 4, wherein the data center computer is located remote from the [game] *sweepstakes* site and the system manager computer is located at the [game] *sweepstakes* site.

9. The network according to claim 4, wherein the [game is a] sweepstakes [that] is controlled by the data center computer.

11. The network according to claim 1, further comprising:

at least one recharge station in data communication with the system manager computer for recharging the prepaid voucher with additional goods and services unrelated to the [game] *sweepstakes*.

12. The network according to claim 11, wherein the recharge station comprises:

a means for receiving currency;

and a means for reactivating the prepaid voucher;

wherein upon reactivating of the prepaid voucher, a corresponding number of entry units for [participating] *optionally entering* in the [game] *sweepstakes* are provided.

14. The network according to claim 1, wherein the prepaid voucher comprises:

a substrate; and a readable and writeable digital storage means carried by the substrate for storing digital data related to the [game] *sweepstakes* and the goods and services unrelated to the [game] *sweepstakes*.

17. The network according to claim 1, wherein the [game participating] *at least one sweepstakes participation* terminal comprises:

a housing;

a microprocessor disposed within the housing for controlling the [game] *at least one sweepstakes* participation terminal;

a means for reading data from and writing data to the prepaid voucher;

a video display carried by the housing; and at least one button for inputting commands to the [game] *at least one sweepstakes* participation terminal.

18. The network according to claim 17, wherein the [game] *at least one sweepstakes* participation terminal includes no means for accepting currency.

19. The network according to claim 17, wherein the video display is a touch screen adapted for receiving and transmitting touch input commands to the [game participating] *at least one sweepstakes participation* terminal.

20. The network according to claim 17, wherein the video display is parsed into a plurality of viewing portions for displaying the status of the [game] *sweepstakes* and the prepaid voucher.

21. The network according to claim 1, wherein the [game] *sweepstakes* is chosen from a plurality of different [game] *sweepstakes*.

24. The network according to claim 1, wherein the [game] *at least one sweepstakes* participation terminal is a computer adapted for Internet communication.

25. The network according to claim 1, wherein the at least one [game] *sweepstakes* participation terminal is a computer adapted for Internet communication and the [game] *sweepstakes* site is an Internet cafe.

26. A method of conducting a sweepstakes wherein a game player obtains sweepstakes [entries] *entry units* upon purchasing valuable goods and services unrelated to the sweepstakes, the method comprising the steps of:

providing prepaid vouchers for goods and services unrelated to the sweepstakes;

activating the prepaid vouchers with [optional entries] *entry units that may be used to optionally enter* into the sweepstakes without requiring the game player to provide personal identifying information;

providing a plurality of sweepstakes terminals in data communication with each other; and permitting the game player to enter the sweepstakes with the [optional entries] *entry units*.

27. The method according to 26, wherein the step of activating the prepaid vouchers with [optional entries] *entry units for optionally entering* into the sweepstakes is achieved by issuing a personal identification number to the prepaid voucher for use with the goods and services unrelated to the sweepstakes.

28. The method according to claim 26, wherein the number of [optional entries] *entry units for optionally entering into the sweepstakes* is directly proportional to the value of the prepaid voucher.

32. The method according to claim 26, further comprising the steps of:

providing at least one recharge station having a means for receiving currency; and a means for reactivating the prepaid voucher with additional goods and services unrelated to the [game] *sweepstakes*;

placing the recharge station in data communication with the system manager computer;

placing the prepaid voucher in data communication with the means for reactivating the prepaid voucher; and reactivating the prepaid voucher with additional goods and services unrelated to the [game] *sweepstakes* and a corresponding number of entry units for [participating] *entering* in the sweepstakes.

38. A method of conducting a sweepstakes wherein a game player obtains sweepstakes [entries] *entry units* upon purchasing valuable goods and services unrelated to the sweepstakes, the method comprisng the steps of:

providing a pluraity of prepaid vouchers for goods and services unrelated to the sweepstakes;

providing at least one activation terminal for activating the prepaid vouchers;

providing a plurality of interconnected sweepstakes terminals at a first location, each sweepstakes terminal having a video display, input buttons, and a means for receiving the prepaid vouchers;

providing at least one system manager computer at the first location;

providing a data center computer at a second location that is remote from the first location;

placing the sweepstakes terminals, the system manager computers, the activation terminals, the data center computers, and the means for reactivating the prepaid vouchers in data communication;

activating at least one of the plurality of prepaid vouchers with the activation terminal, so as to create a number of [optional] free [entries into the] sweepstakes *entry units for optionally entering into the sweepstakes* corresponding to the value of the goods and services without requiring the game player to identify himself;

receiving the activated prepaid voucher in data communication with the means for receiving the prepaid voucher;

conducting the sweepstakes in response to game selections input at the sweepstakes terminal with the video display and the input buttons; and displaying the results of the sweepstakes play in the video display.

39. The method according to claim 38, further comprising the steps of:

providing a means for reactivating the prepaid vouchers with additional goods and services unrelated to the sweepstakes; and reactivating the prepaid voucher, so as to create an additional number of [optional] free [entries] *entry units for optionally entering* into the sweepstakes corresponding to the value of the additional goods and services.

43. A network for conducting a [game] *sweepstakes* comprising:

a prepaid voucher for goods and services unrelated to the [game] *sweepstakes*;

a means for activating the prepaid voucher;

at least one [game] *sweepstakes* participation terminal located at a game site, [each game] *the at least one sweepstakes* participation terminal being adapted for data communication with the prepaid voucher; and at least one system manager computer in data communication with the [game] *at least one sweepstakes* participation [terminals] *terminal*;

wherein *the* at least one [of said game] *sweepstakes* participation [terminals] *terminal* is an 8-liner machine having a housing;

an 8-liner microprocessor disposed within the housing for controlling the 8-liner machine;

a video display carried by the housing;

at least one button for inputting commands to the 8-liner machine; and a conversion kit for converting the 8-liner machine to [a game participating] *the at least one sweepstakes participation* terminal, the kit having a conversion microprocessor in data communication with the 8-liner microprocessor and the system manager computer; and a means for reading data from and writing data to the prepaid voucher; and wherein upon activation of the prepaid voucher, a corresponding number of entry units for optionally [participating] *entering* in the [game] *sweepstakes* are provided.

44. A network for conducting a [game] *sweepstakes* comprising:

a prepaid voucher for goods and services unrelated to the [game] *sweepstakes*;

a means for activating the prepaid voucher;

at least one system manager computer in data communication with the means for activating the prepaid vouchers; and at least one 8-liner machine located at a game site, each 8-liner machine adapted for data communication with the prepaid voucher, the 8-liner machine having an 8-liner microprocessor controlling the 8-liner machine;

at least one button for inputting commands to the 8-liner microprocessor;

a conversion microprocessor in data communication with the 8-liner microprocessor and the system manager computer; and a means for reading data from and writing data to the prepaid voucher, wherein upon activation of the prepaid voucher, a corresponding number of entry units for optionally [participating] *entering* in the [game] *sweepstakes* are provided.

* * * * *

US007316614C3

(12) INTER PARTES REEXAMINATION CERTIFICATE (786th)

United States Patent

Dietz et al.

(10) Number: US 7,316,614 C3

(45) Certificate Issued: Jan. 8, 2014

(54) METHOD AND APPARATUS FOR CONDUCTING A SWEEPSTAKES

(76) Inventors: Michael J. Dietz, Peralta, NM (US); Earl D. Morris, Albuquerque, NM (US); Mark Olmstead, Denton, TX (US); Robert E. Houchin, Azle, TX (US); Johnney R. Weaver, Weatherford, TX (US)

Reexamination Request:
No. 95/001,479, Nov. 2, 2010

Reexamination Certificate for:

| | |
|---|---|
| Patent No.: | **7,316,614** |
| Issued: | **Jan. 8, 2008** |
| Appl. No.: | **10/701,284** |
| Filed: | **Nov. 4, 2003** |

Reexamination Certificate C1 7,316,614 issued Aug. 18, 2009

Reexamination Certificate C2 7,316,614 issued Dec. 7, 2010

Certificate of Correction issued Jan. 29, 2008

(51) Int. Cl.
*A63F 13/00* (2006.01)

(52) U.S. Cl.
USPC .......... 463/25

(58) Field of Classification Search
USPC .......... 463/25
See application file for complete search history.

(56) References Cited

To view the complete listing of prior art documents cited during the proceeding for Reexamination Control Number 95/001,479, please refer to the USPTO's public Patent Application Information Retrieval (PAIR) system under the Display References tab.

*Primary Examiner* — Cameron Saadat

(57) ABSTRACT

A method and apparatus for conducting a sweepstakes in which a consumer purchases a prepaid voucher for valuable goods and services unrelated to the sweepstakes, and in return, as a promotional bonus, is provided a corresponding number of optional entries into the sweepstakes is disclosed.

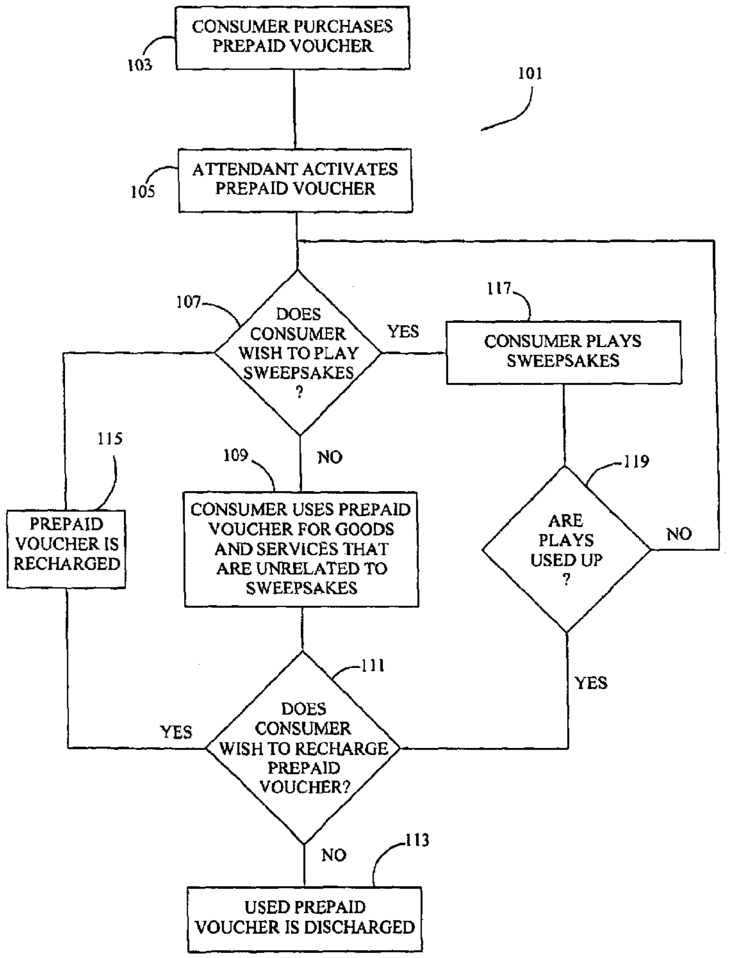

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 16 was previously cancelled.

Claims 25, 37, 43 and 44 are cancelled.

Claims 1, 26 and 38 are determined to be patentable as amended.

Claims 2-15, 17-24, 27-36 and 39-42, dependent on an amended claim, are determined to be patentable.

1. A network for conducting a sweepstakes wherein a game player obtains sweepstakes entry units upon purchasing valuable goods and services unrelated to the sweepstakes, the network comprising:

a plurality of prepaid vouchers for goods and services unrelated to the sweepstakes;

a means for activating the prepaid vouchers without requiring the game player to provide player identification information;

at least one sweepstakes participation terminal located at a sweepstakes site, each sweepstakes participation terminal being adapted for data communication with the prepaid vouchers; and at least one system manager computer in data communication with the at least one sweepstakes participation terminal;

wherein upon activation of each of the prepaid vouchers, a corresponding number of sweepstakes entry units for optionally entering in the sweepstakes are provided to the game player for entering the sweepstakes using the prepaid voucher*; and*

*wherein the at least one sweepstakes participation terminal is a computer adapted for Internet communication and the sweepstakes site is an Internet cafe.*

26. A method of conducting a sweepstakes wherein a game player obtains sweepstakes entry units upon purchasing valuable goods and services unrelated to the sweepstakes, the method comprising the steps of:

providing prepaid vouchers for goods and services unrelated to the sweepstakes;

activating the prepaid vouchers with entry units that may be used to optionally enter into the sweepstakes without requiring the game player to provide personal identifying information;

providing a plurality of sweepstakes terminals in data communication with each other; and permitting the game player to enter the sweepstakes with the entry units*;*

*wherein the step of providing a plurality of sweepstakes terminals in data communication with each other is achieved by providing an Internet cafe; and at least one of the sweepstakes terminals is a computer located within the Internet cafe adapted for Internet communication.*

38. A method of conducting a sweepstakes wherein a game player obtains sweepstakes entry units upon purchasing valuable goods and services unrelated to the sweepstakes, the method comprising the steps of:

providing a plurality of prepaid vouchers for goods and services unrelated to the sweepstakes;

providing at least one activation terminal for activating the prepaid vouchers;

providing a plurality of interconnected sweepstakes terminals at a first location, each sweepstakes terminal having a video display, input buttons, and a means for receiving the prepaid vouchers;

providing at least one system manager computer at the first location;

providing a data center computer at a second location that is remote from the first location;

placing the sweepstakes terminals, the system manager computers, the activation terminals, the data center computers, and the means for reactivating the prepaid vouchers in data communication;

activating at least one of the plurality of prepaid vouchers with the activation terminal, so as to create a number of free sweepstakes entry units for optionally entering into the sweepstakes corresponding to the value of the goods and services without requiring the game player to identify himself;

receiving the activated prepaid voucher in data communication with the means for receiving the prepaid voucher;

conducting the sweepstakes in response to game selections input at the sweepstakes terminal with the video display and the input buttons; and displaying the results of the sweepstakes play in the video display*;*

*wherein the step of providing a plurality of interconnected sweepstakes terminals is achieved by providing an Internet cafe; and at least one of the sweepstakes terminals is a computer located within the Internet cafe adapted for Internet communication.*

* * * * *